US008203444B2

(12) United States Patent
Strohallen et al.

(10) Patent No.: US 8,203,444 B2

(45) Date of Patent: Jun. 19, 2012

(54) ALERTING DEVICE WITH SUPERVISION

(75) Inventors: Gene Michael Strohallen, North Manchester, IN (US); George J. Elwell, Lake Orion, MI (US)

(73) Assignee: Silent Call Corporation, Waterford, MI (US)

( * ) Notice: Subject to any disclaimer, the term of this patent is extended or adjusted under 35 U.S.C. 154(b) by 471 days.

(21) Appl. No.: 12/481,638

(22) Filed: Jun. 10, 2009

(65) Prior Publication Data

US 2009/0303031 A1 Dec. 10, 2009

Related U.S. Application Data

(60) Provisional application No. 61/060,302, filed on Jun. 10, 2008.

(51) Int. Cl.

*G08B 29/00* (2006.01)
*G08B 1/08* (2006.01)
*H04B 3/36* (2006.01)

(52) U.S. Cl. ................ 340/506; 340/539.1; 340/539.11; 340/539.15; 340/4.12; 340/7.6; 340/407.1

(58) Field of Classification Search .................. 340/506
See application file for complete search history.

(56) References Cited

U.S. PATENT DOCUMENTS 4,101,872 A * 7/1978 Pappas .................... 340/539.22
4,462,022 A * 7/1984 Stolarczyk .................... 340/506
6,529,131 B2 * 3/2003 Wentworth ................ 340/573.1
2006/0226973 A1 * 10/2006 Catlin ...................... 340/539.11

* cited by examiner

*Primary Examiner* — Donnie Crosland

(74) *Attorney, Agent, or Firm* — Harness, Dickey & Pierce, P.L.C.

(57) ABSTRACT

An alerting system for alerting a user having a transmitter monitoring a predetermined condition (i.e. sound, telephone, door/window access, fire, carbon monoxide, emergency weather alerts, etc.) and outputting an alarm signal in response to detection of the predetermined condition. The transmitter further outputs a supervisory signal indicative of operation of the transmitter (i.e. low battery condition, out of range, etc.). The alerting system further includes an alerting device receiving the alarm signal and the supervisory signal from the transmitter and detecting cessation of the supervisory signal device and outputting a first alert signal to the user indicative of the cessation of the supervisory signal. The alerting device further detecting presence of the alarm signal and outputting a second alert signal to the user indicative of presence of the predetermined condition.

23 Claims, 4 Drawing Sheets

ALERTING DEVICE WITH SUPERVISION

CROSS-REFERENCE TO RELATED APPLICATIONS

This application claims the benefit of U.S. Provisional Application No. 61/060,302, filed on Jun. 10, 2008. The entire disclosure of the above application is incorporated herein by reference.

FIELD

The present disclosure relates to alerting devices for the disabled and, more particularly, relates to alerting devices having supervisory capability for monitoring transmitters and communications therewith.

BACKGROUND AND SUMMARY

This section provides background information related to the present disclosure which is not necessarily prior art. This section also provides a general summary of the disclosure, and is not a comprehensive disclosure of its full scope or all of its features.

As is well known in the art, alarm systems are readily available for use by handicapped users, such as those that are blind, deaf, or otherwise impaired, to alert the handicapped user of some predetermined condition, such as a doorbell, telephone, or alarm being activated. The alarm system can then output audible, visual, and/or tactile stimuli to the handicapped user.

These conventional alarm systems typically employ a sensor sensitive to the predetermined condition that transmits a signal, either via wired or wireless communication means, to a fixed reporting station. This fixed reporting station can be permanently mounted in a home or business or temporarily mounted on a tabletop, and configured to receive the signals from the sensors and output a corresponding alert, such as a flashing strobe, horn, or vibration, to the user.

While the aforementioned alarm systems are useful for their intended purpose, it should be appreciated that they are limited to a certain location by their physical constraints. Moreover, because of their reduced portability, it is often necessary to employ multiple reporting stations throughout a building to permit a moving user to be confident that they will be within range to hear, see, or otherwise be stimulated in response to an alert. This often requires the purchase, setup, and maintenance of reporting stations in each of the main rooms of a home or business, thereby increasing initial costs and ongoing maintenance costs and likewise adding to the overall complexity of the system.

Furthermore, it should be appreciated that in some applications it may be desirable to ensure that communication is positively maintained between the sensor unit and the reporting station. In the case where such communication between the sensor unit and the reporting station is intermittent or otherwise interrupted, alarm signals may be similarly interrupted and indication of the corresponding alert prevented.

Therefore, in accordance with the principles of the present teachings, a comprehensive alerting system is provided for alerting a user. The alerting system includes a transmitter monitoring a predetermined condition (i.e. sound, telephone, door/window access, fire, carbon monoxide, emergency weather alerts, etc.) and outputting an alarm signal in response to detection of the predetermined condition. The transmitter further outputs a supervisory signal indicative of operation of the transmitter (i.e. low battery condition, out of range, etc.) and/or a positive communication link there between. The alerting system further includes an alerting device receiving the alarm signal and the supervisory signal from the transmitter and detecting cessation of the supervisory signal device and outputting a first alert signal to the user indicative of the cessation of the supervisory signal. The alerting device further detecting presence of the alarm signal and outputting a second alert signal to the user indicative of presence of the predetermined condition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
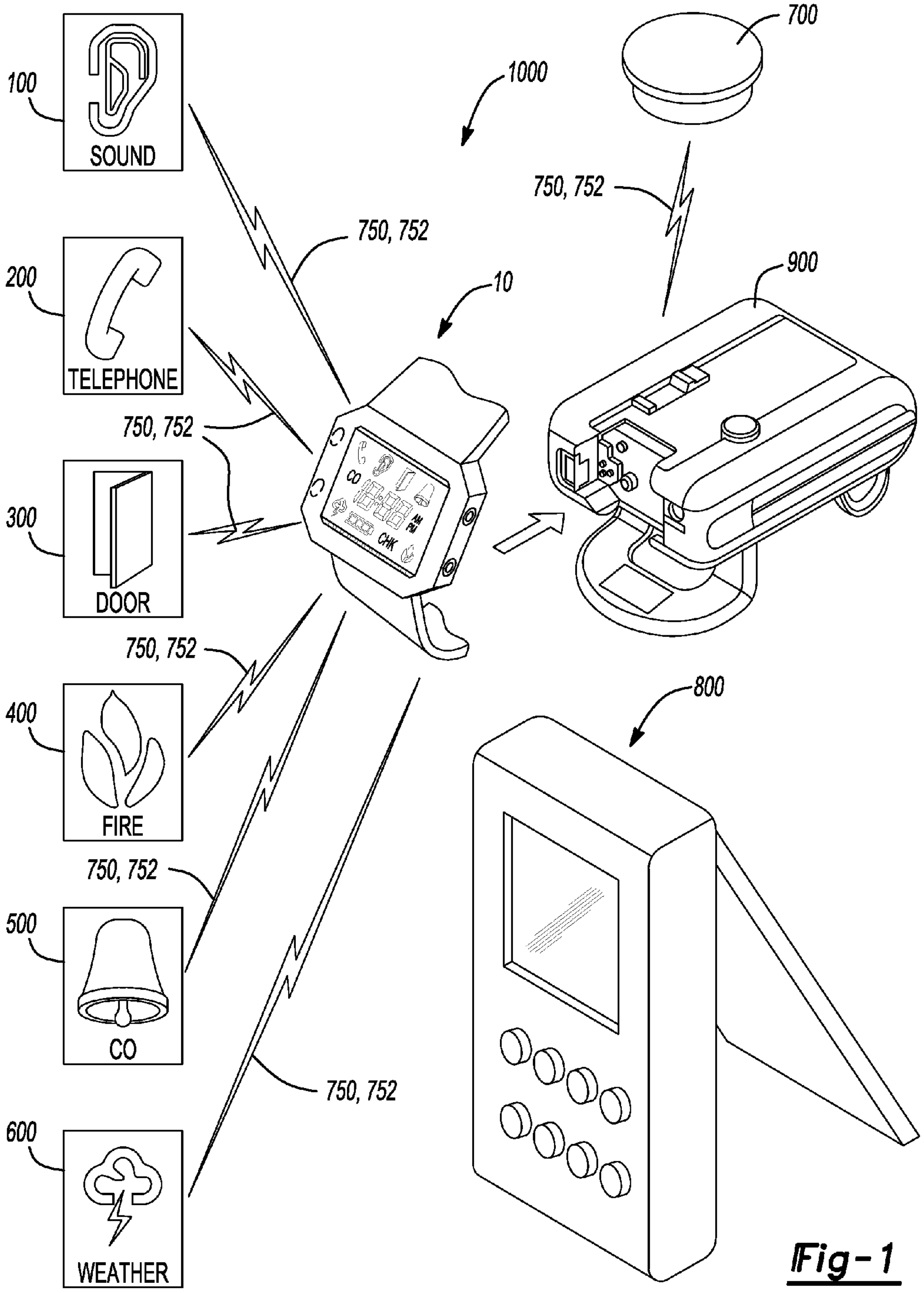
FIG. 1 is a schematic view of an alerting system according to the principles of the present teachings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on”, “engaged to”, “connected to” or “coupled to” another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or"

According to the principles of the present teachings, an alerting system and, more particularly, an alerting watch device, is provided for use by disabled and/or impaired individuals or other individuals for use in environments where visual and/or aural senses are limited.

The alerting watch device, generally indicated at 10, can be used in connection with any one of a number of components to form a comprehensive alerting system 1000, as will be described in detail herein. In some embodiments, alerting system 1000 can comprise a plurality of discreet and distinct transmitters broadcasting at least an alert signal indicative of a predetermined condition and, in some embodiments, a supervisory signal indicative of an operational status of the transmitter and associated sensor device. Each of the plurality of transmitters can be remotely spaced relative to the alerting device.

With particular reference to FIG. 1, generally, alerting system 1000 comprise any combination of a sound monitor transmitter 100, a telephone/TTY/VCO transmitter 200, a door/window access transmitter 300, a fire alarm transmitter 400, a carbon monoxide (CO) transmitter 500, an emergency weather alert transmitter 600, and a miscellaneous transmitter 700 together with alerting watch device 10 and optional charger 900. It should also be appreciated that additional transmitters can be used in connection with the principles of the present teachings. It should also be appreciated that a non-wristwatch style alerting device 800 can be used in place of or supplemental to alerting watch device 10. As will be described in detail herein, each of the plurality of transmitters can output the alert signal and/or supervisory signal via wireless RF transmitter circuitry.

Alerting Watch Device

Figure 2:
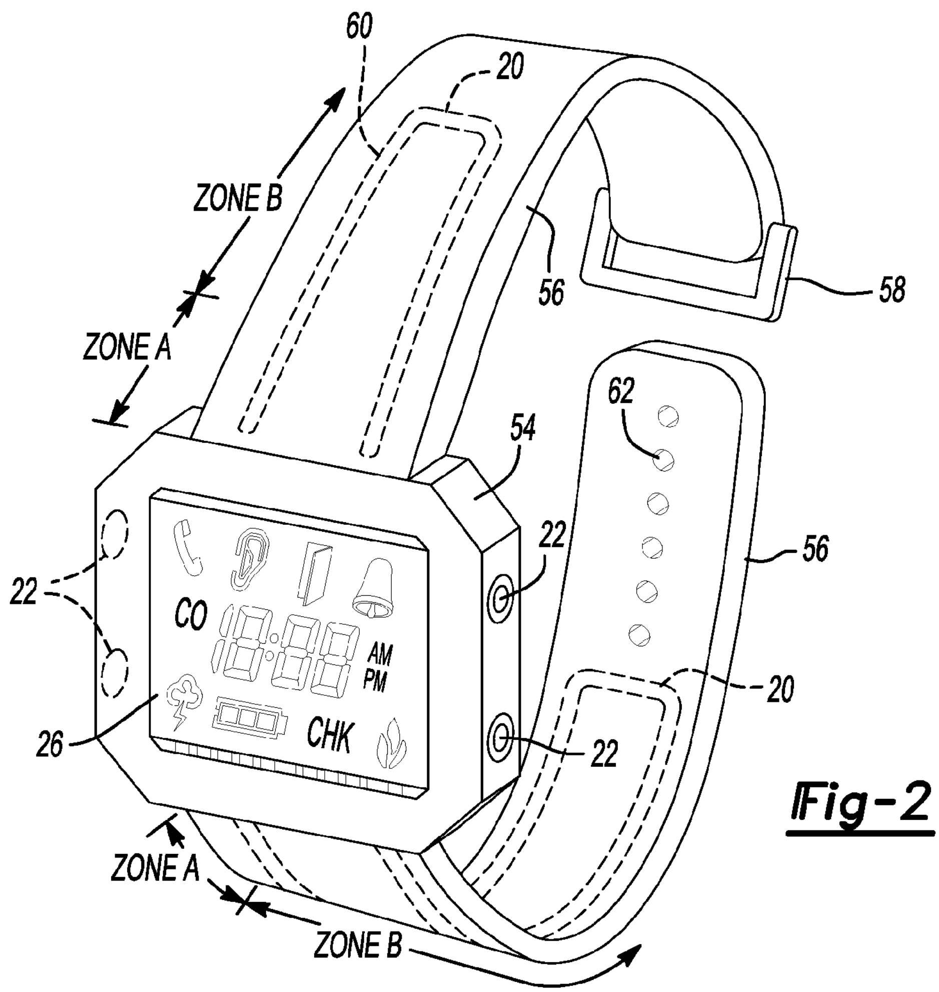
FIG. 2 is a perspective view of an alerting watch device according to some embodiments of the present teachings.

With reference to FIGS. 1 and 2, in some embodiments, alerting watch device 10 is a wrist-watch type device providing a timepiece, built-in time-based alarm, and other conventional wrist-watch type capability. Additionally, alerting watch device 10 is communicable with any one or a combination of sound monitor transmitter 100, telephone/TTY/VCO transmitter 200, door/window access transmitter 300, fire alarm transmitter 400, carbon monoxide (CO) transmitter 500, emergency weather alert transmitter 600, and miscellaneous transmitter 700. To this end, as seen in FIG. 3, alerting watch device 10 comprises a control circuit 12 comprising RF receiver 14, a microprocessor 16 electrically coupled to receiver 14, a timing crystal 18, an antenna 20, pushbutton switches 22, a vibrating motor 24, a visual display 26, backlight 28, a power source 30 (i.e. battery) capable of supplying power thereto, and an optional speaker device 32, which will each be described in greater detail herein.

Alerting watch device 10 is operable to receive alert signals 750 and, in some embodiments, supervisory signals 752 and output an audible, visual, and/or tactile stimuli to the user in response to the alert signals 750 and/or supervisory signals 752, without the need for additional alarms or other alerting devices. Alerting watch device 10 further functions as a timepiece and time-based alarm thereby replacing the standard wrist watch. Alerting watch device 10 provides the audible, visual, and/or tactile stimuli by means of internal speaker 32, visual icons 34-48 located on visual display 26 of alerting watch device 10, and vibrating motor 24, respectively. However, it should be appreciated that other stimuli can be used, such as strobe lights, horns, and the like.

Figure 4:
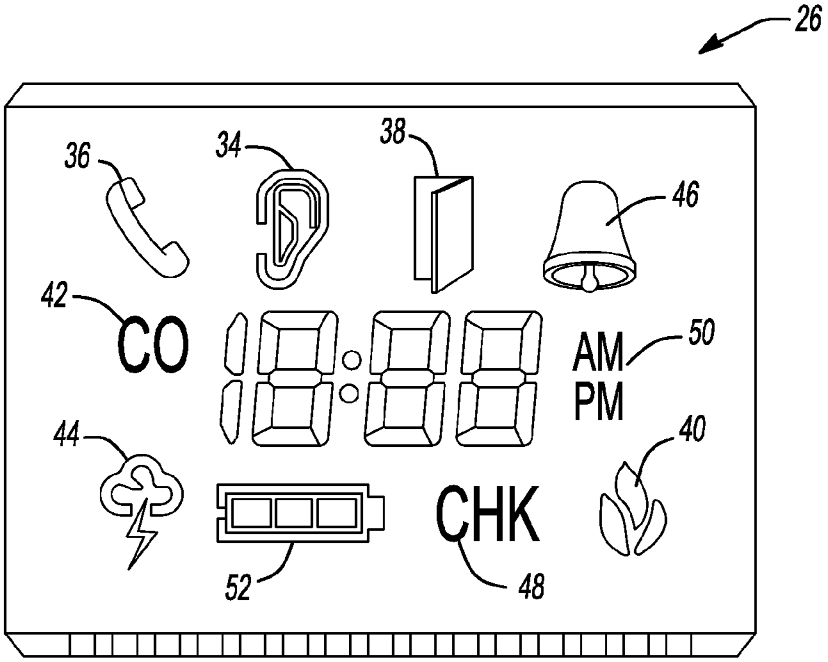
FIG. 4 is a plan view of a visual display for use with the alerting watch device.
Figure 5:
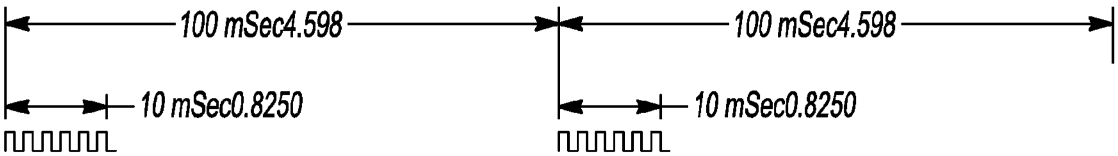
FIG. 5 is a schematic view of transmission protocol according to the principles of the present teachings.

In some embodiments, as seen in FIGS. 1, 2, and 4, visual display 26 of alerting watch device 10 comprises a series of visual cues, indicia, and/or icons 34-48 each representative of a particular alert and selectively displayed on visual display 26. It should be appreciated that the principles of the present teachings can find utility in connection with a wide range of applications, including alerts from medical devices, theft systems, and the like. Therefore, the particular systems monitored by alerting watch device 10 and the corresponding icons displayed on visual display 26 can vary. Notwithstanding, in the presently described embodiment, visual display 26 can comprise separately displayable icons, including a sound monitor icon 34, a telephone/TTY/VCO icon 36, a door/window access icon 38, a fire alarm icon 40, a carbon monoxide (CO) icon 42, a weather alert icon 44, a miscellaneous icon 46 that can be used for any additional transmitter or internal watch alarm function, and a CHK (check) icon 48 indicative of a system supervisory warning. Visual display 26 further comprises a series of numeric characters and AM/PM indicator (collectively, reference numeral 50) operable for displaying current time. Still further, visual display 26 comprises a battery icon 52 operable to display the current charge status of power source 30, wherein segmented icon bars indicate a general percentage of charge remaining.

Figure 3:
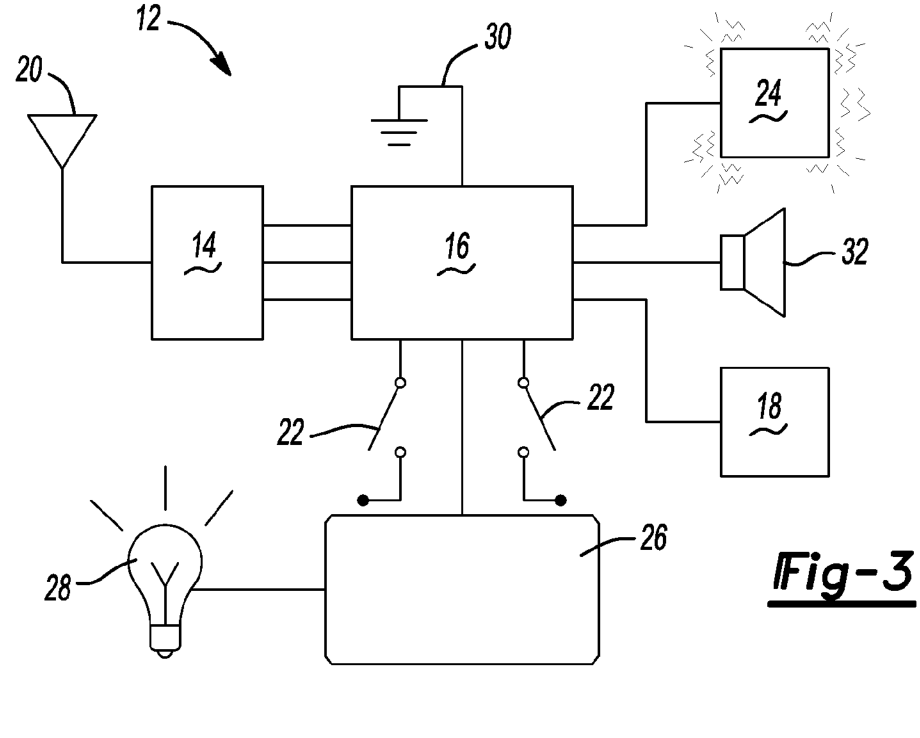
FIG. 3 is a schematic diagram of a control circuit.

As illustrated in FIG. 3, visual display 26 can comprise backlight 28 operable to highlight visual display 26, thereby improving visibility and readability of the time and alarms during low light usage. In operation, backlight 28 can be configured to turn on during an alarm period or when one wishes to view the time when the display is no longer visible under normal lighting conditions.

In some embodiments, vibrating motor 24 comprises a motor operable to generate a mechanical displacement in response to an electrical signal from microprocessor 16. The mechanical displacement is sufficient to produce a tactile stimulus to the user. It should be appreciated that vibrating motor 24 of alerting watch device 10 can be substantially smaller than other tactile stimulating devices currently available, such as pager-type device, because the threshold necessary to alert a user when the tactile stimulus is applied to the wrist or arm area is substantially less than when the tactile stimulus is applied to the waist or other generally insensitive areas of the user's body.

In some embodiments, vibrating motor 24 can be actuated to produce a specific pulse pattern indicative of a discrete alarm or supervisory signal. In other words, it is anticipated that vibrating motor 24 can provide a series of pulses representing different alarms. For example, vibrating motor 24 can be actuated to pulse twice when the door/window access alarm is activated and an alarm signal is received from door/window access transmitter 300. A corresponding audible pattern can also be played via internal speaker 32, and door/window access icon 38 can be displayed on visual display 26 to further confirm the type of alarm. The pulse codes are configured to match an array of products so that the user need only learn the pulses once in order to identify the alarm. The vibration pulses are also created in a manner making it easy for a visually impaired or hearing impaired person to interpret. In some embodiments, vibrating motor 24 can employ a plurality of discrete pulse sequences, such as:

DOOR—two short pulses repeated twice (••)

TELEPHONE—one long pulses (------)

SOUND—three short pulses repeated twice (•••)

WEATHER—two short and one long pulse repeated twice (••------ •• ------)

FIRE—continuous short pulses (•••••••••••)

CO—one long and three short pulses repeated twice (------ ••═------•••)

It should be appreciated that the actual pulse code may vary depending on various design criteria, however, most importantly it should be appreciated that by using a discrete pulse sequence for each alarm and/or notification, a user can learn and identify the pulse sequence and associated notification without having to rely on visual or audible confirmation, if desired. The pulse codes can also be recalled by depressing one of the side buttons 22 located on the side of alerting watch device 10.

With continued reference to FIGS. 1 and 2, alerting watch device 10 further comprises a watch housing 54 for containing control circuit 12, wrist bands 56 fixedly coupled to watch housing 54, a clasp 58 coupled to distal ends of wrist bands 56 for interlocking wrist bands 56 to securely fasten alerting watch device 10 in intimate engagement with the wrist of a user. Housing 54 of alerting watch device 10 is configured to contain pushbutton switches 22 for ease of access along the face and/or sides thereof by a user.

Pushbutton switches 22 of alerting watch device 10 can be configured to function in any one of a number of modes, however, by way of example, pushbutton switches 22 can facilitate:

1. Selecting of Time of Day (Hours, Minutes, AM or PM);
2. Selecting watch alarm time (Hours, Minutes, AM or PM);
3. Programming a transmitter to operate with alerting watch device 10. In some embodiments, alerting watch device 10 will only respond to alarm transmitters whose transmitter address has been previously programmed into alerting watch device 10. Once programmed, alerting watch device 10 will record the transmitter address in its non-volatile memory of microprocessor 16;
4. Erasing the transmitter memory bank;
5. Recalling the last alarm sent; and
6. Viewing the time with the aid of backlight 28.

Alerting watch device 10, in some embodiments, is operable to receive alert signals and/or supervisory signals while being worn by a user in various positions and orientations on the arm or wrist at ranges of 200 feet or more. It has been found that alerting watch device 10 can be used at these ranges even as the user is moving, walking, and/or working without unduly limiting or interfering with communication of alerting watch device 10 and the plurality of transmitters 100, 200, 300, 400, 500, 600, 700. Alerting watch device 10 is able to achieve these performance benefits as a result of overcoming numerous design hurdles that have led to the selection of an operating frequency (418 MHz) high enough to permit the usage of an antenna capable of operating in the subject environment, design of a receiver capable of being sufficiently sensitivity to overcome the limits of an antenna being worn on the arm or wrist, creation of a data transmission scheme that takes advantage of regulatory requirements for power emission, and selection of a power source to power alerting watch device 10 over a predetermined period of time (i.e. about 20 hours).

Control Circuit

With particular reference to FIGS. 2 and 3, control circuit 12 of alerting watch device 10 comprises antenna 20 operably coupled to receiver 14 for receiving alarm signals and/or supervisory signals from the plurality of transmitters 100, 200, 300, 400, 500, 600, 700 and outputting data in the form of a binary signal. Receiver 14 is then operably coupled to microprocessor 16 for communicating data from receiver 14 to microprocessor 16, and vice versa. In some embodiments, receiver 14 and microprocessor 16 are configured to relay duty cycle control signals and/or RSSI signals. Microprocessor 16 is further operably coupled with timing crystal 18, pushbutton switches 22, a vibrating motor 24, visual display 26, backlight 28, power source 30, and speaker 32 for operation therewith.

Microprocessor

In this regard, microprocessor 16 is operable to maintain the timing of alerting watch device 10 in addition to controlling all functions of alerting watch device 10. In some embodiments, microprocessor 16 is operable to perform any one or a combination of the following tasks:

1. Monitor the battery voltage and power down circuits and functions, when those power down circuits and functions are not required, as a means of conserving battery power.
2. Detect the received binary signal from receiver 14.
3. Interpret the binary signals from receiver 14 and output the appropriate audible, visual, and/or tactile stimuli to the user.
4. Receive input signals from pushbutton switches 22 for configuring the settings and/or visual display 26 in response to input from the user.
5. Actively monitor one or more of the sound monitor transmitter 100, telephone/TTY/VCO transmitter 200, door/window access transmitter 300, fire alarm transmitter 400, carbon monoxide (CO) transmitter 500, weather alert transmitter 600, and miscellaneous transmitter 700 and report on their absence, low battery condition, or other monitored parameter. Each transmitter may have one or more bits assigned for supervision. The bits may contain supervisory data such as low battery, alarm sensor not functioning, or any parameter that is vital to supervision. The received signal decodes the data bits into several sections such as alarm type, alarm address and supervision bits. For example, a low battery supervision bit would be transmitted indicating that the transmitter's battery power is low and needs replacement. In addition, the absence of the transmitted signal can be taken as a loss in the signal. The microprocessor maintains a timeout sequence for each and every transmitter supervised. The timeout register is reset whenever the transmitted signal is received. If a transmitted signal is failed to be received within several timeout periods, the microprocessor will count that as the transmitter signal lost and report it as a CHECK alarm.

A separate input may be used for detection of an RF transmitted signal. The input is referred to as the RSSI or Receive Signal Sensitivity Input. The RSSI signal produces an analog equivalent, in milli-volts, equivalent to the RF receiver input. The RSSI voltage increases with the presence of an RF signal. The strength of the RF signal also determines the RSSI voltage.

Firmware for microprocessor 16 can be located in FLASH memory. The memory can be changed at a factory by connecting a connector into charger base 900. The program can be entirely replaced or updated within a period of less than one minute. Additionally, user defined settings can be stored in microprocessor 16 in non-volatile memory to ensure such settings are retained in the event of excess power dissipation.

Antenna

It should be appreciated that the selection of antenna 20 is related to the sensitivity of receiver 14. That is, it should be appreciated that any antenna mounted at or near the body of a user will degrade in performance and thus it is important to choose an antenna that overcomes these design issues. To this end, in some embodiments, antenna 20 comprises a ½-wave dipole with each dipole element 60 (FIG. 2) embedded in wrist band 56 of alerting watch device 10. As seen in FIG. 2, dipole elements 60 can be constructed of a flexible conductive element that will not break or weaken during use and is, in some embodiments, can be encapsulated within wrist band 56 to provide additional protection from wear and the environment as illustrated. Moreover, by encapsulating antenna 20 within wrist band 56, contact between antenna 20 and the user's body can be avoided, which could otherwise degrade antenna performance and require increased receiver sensitivity and power consumption. In some embodiments, dipole elements 60 of antenna 20 are fully sealed within watch housing 54 and wrist band 56 to provide protection from water and the environment. Antenna 20 is electrically coupled to receiver 14 and designed to match the input circuit impedance of receiver 14. A poor match between the antenna 20 and the receiver 14 results in a mis-match of impedances which would lead to a lower sensitivity at the receiver input. The antenna design, geometry and configuration with respect to the placement of the receiver circuit are critical in providing the optimal coupling between the antenna impedance and the receiver input impedance.

As seen in FIG. 2, the particular construction of wrist band 56 of alerting watch device 10 reduces stress and fatigue of antenna 20. More particularly, in some embodiments each dipole element 60 of antenna 20 is electrically coupled with and extends from receiver 14 through watch housing 54 and into wrist band 56. This interconnection of wrist band 56 and watch housing 54 is non-pivotable in that it forms a generally integral, unitary construction, unlike conventional watch housings, generally indicated as Zone A of FIG. 2. In this regard, stress and fatigue is minimized along dipole elements 60 of antenna 20 at such interface (Zone A). However, flexibility of wrist band 56 is provided distal of Zone A to permit comfortable and convenient use of alerting watch device 10. To this end, Zone B, distal of Zone A, is progressively more flexible by virtue of the material used and/or structural design of wrist band 56. However, the elastic deformation of wrist band 56 should be selected such that it is below the plastic deformation thresholds of antenna 20 to prevent failure of antenna 20. In some embodiments, Zone A can comprise about one-quarter to one-third of the length of each end of wrist band 56. It should appreciated that dipole elements 60 can extend to a position prior to clasp holes 62 to prevent undue stress on dipole elements 60 during normal wear. However, in some embodiments, dipole elements 60 can extend beyond and perhaps surround clasp holes 62 for additional antenna coverage.

Antenna 20 is designed and configuration as determined by the best optimal form of coupling between the transmitter antennas and the receiver antenna. Considering that antenna 20 polarization can change based on the user's arm movement and orientation, the present teachings employ vertical polar orientation between alerting watch device 10 and the plurality of transmitters 100, 200, 300, 400, 500, 600, 700. By maintaining a uniform setting of transmitter antennas, such as vertical polarization, each transmitter produces a uniform radiation pattern which is ideal for overall performance in a situation where the user wearing the watch is in motion and where the watch orientation is changing with respect to the vertical polarization of the transmitter antennas. The receiver sensitivity also makes up the difference between the polar effects of the receive antenna and transmit antenna. Vertical polarization provides for a uniform radiation pattern transmitted from each of the plurality of transmitters 100, 200, 300, 400, 500, 600, 700. The worst case alignment is when antenna 20 of alerting watch device 10 is horizontally polarized. The watch antenna 20 polarization and the transmitter antennas 100, 200, 300, 400, 500, 600, 700 are matched based on case studies and empirical data collected to determine the optimum form of coupling.

It should be appreciated that antenna 20 provides a number of benefits not found in the prior art, not the least of which is being contained within wrist band 56 of alerting watch device 10, providing proper impedance to match receiver 14, being tuned to operate over a predetermined RF frequency, and providing sufficient bandwidth to receive alarm signals 750 and supervisory signals 752 from any one of the plurality of transmitters 100, 200, 300, 400, 500, 600, 700.

Receiver

To compensate for the potentially degraded performance of an antenna mounted at or near the body of a user, receiver 14 is designed to be highly sensitive. The receiver sensitivity can be increased by several methods: 1) use of a Low Noise Amplifier (LNA)—the LNA amplifies the received rf signal by an increase in the rf signal voltage; 2) improved IF amplifier capable of extracting a greater signal over the noise floor; 3) an input filter network reducing the out-of-band noise and improving the overall signal to noise of the received signal; and 4) a superior receiver design that employs the above described techniques, uses a varied receiver design such as dual conversion, or super-regenerative design. A receiver's sensitivity is often tied to a receiver's power consumption in that additional circuits are often required to increase the input sensitivity of a receiver that, in turn, requires more power for proper operation.

According to the principles of the present teachings, receiver 14 is self contained and is crystal controlled to operate on one frequency. Control circuit 12 of alerting watch device 10 can be configured to operate on more than one frequency using frequency synthesis. Direct sequence or other forms of multiple frequency operation can be used, which can then be programmed to select a wide array of RF channels or frequencies if future needs require.

In some embodiments, receiver 14 further comprises a duty cycle control module that permits receiver 14 to be turned on or off from microprocessor 16 according to a predetermined duty cycle. The duty cycle control module permits receiver 14 to be used only when needed, and will be described in greater detail herein.

Transmission Protocol

Transmission performance of alerting system 1000 is highly dependent on the path loss of the overall system. By way of background, path loss (or path attenuation) is the reduction in power density (attenuation) of an electromagnetic wave as it propagates through space. Path loss is a major component in the analysis and design of the link budget of a telecommunication system. Path loss may be due to many effects, such as free-space loss, refraction, diffraction, reflection, aperture-medium coupling loss, and absorption. Path loss is also influenced by terrain contours, environment (urban or rural, vegetation and foliage), propagation medium (dry or moist air), the distance between the transmitter and the receiver, and the height and location of antennas.

In connection with alerting system 1000, path loss is primarily associated with the transmitted output power measured at the transmitter antenna of each of the plurality of transmitters 100, 200, 300, 400, 500, 600, 700, the particularly frequency employed between the plurality of transmitters and receiver 14, the efficiency of antenna 20, the sensitivity of receiver 14, the relative orientation of antenna 20 and the plurality of transmitters, and the overall distance between receiver 14 and the plurality of transmitters.

To achieve optimum performance each element contributing to the path loss has been addressed in connection with the principles of the present teachings. Specifically, in connection with transmitted output power, it should be understood that regulatory requirements restrict the use of output power based on the frequency used, the type of modulation, and the duty cycle of the transmitted signal. Therefore, it is desirable to keep the transmitted output power as high as legally allowable in order to maintain as low a path loss as possible. Key elements is providing for the maximum allowable output power are the particular frequency used and the duty cycle of the transmitted signal (i.e. alarm signal 750 and supervisory signal 752).

The frequency of choice must be in a region that provides for the best combination of transmitted output power, receiver antenna efficiency and receiver sensitivity. Other factors such as antenna orientation, distance and positioning are also critical in the overall equation.

In order to select the desired parameters for use in connection with alerting system 1000, determination is first made as to the amount of data needed to provide for all monitoring and functionality of alerting watch device 10. To achieve proper data flow, all information transmitted from the plurality of transmitters is compressed into binary bits of data, such that one (1) start and one (1) stop bit defines the boundaries of the entire data packet size resulting in a total data packet. The data bits are then transmitted at a baud rate that permits the lowest duty cycle possible for transmission in order to comply with regulatory requirements. The baud rate is dependent on the operating frequency of the microprocessor and its ability to accurately discern the data bits.

In order to achieve the highest possible output power from the plurality of transmitters, it is desirable that the data bits are sent using a coding technique, such as Manchester Encoding, such that each data bit (ones or zeros) represent a 50% duty cycle. Power output is based on the total duty cycle of the transmitted signal.

The RF data signal (i.e. alarm signal 750 and supervisory signal 752) is sent once every 100 milli seconds. Using Manchester encoding with a selected baud rate that falls within the capability of the microprocessor, the entire data signal is transmitted within a 10 to 20 millisecond window every 100 milli-seconds thereby providing for higher output power from the plurality of transmitters. The data is sent over a period of 2 seconds.

Supervisory Mode

It should be appreciated that in some cases transmission of the data signal may be interrupted or otherwise fail due to any one of a number of problems, such as interference, excessive distance, low battery condition in the transmitter or alerting watch, and the like. To improve the overall operation and reliability, alerting system 1000 provides the ability to monitor or supervise the communication link between each of the plurality of transmitters (or a selective few) and the alerting watch device 10.

By way of background, many varied types of alarms have been provided for persons who are deaf or otherwise impaired. Smoke and fire alarms are of the greatest concern. Many products self report as to the operating condition of the smoke or fire alarm—that is, a person with average hearing can detect the low battery condition of a smoke alarm. However, a person who is deaf or otherwise impaired cannot detect the smoke alarm low battery signal. Typically there is no indication of a low battery condition aside from the smoke alarm beeps.

The supervisory mode of the present teachings monitors the supervisory signal 752 transmitted from any one of the plurality of transmitters 100, 200, 300, 400, 500, 600, 700. Alerting watch device 10 is operable to receive and monitor the supervisory signal 752. Specifically, alerting watch device 10 is operable to monitor and report on the absence of supervisory signal 752. In this way, if supervisory signal 752, which is distinct and separately identifiable for each of the plurality of transmitters equipped with this feature, is absent, alerting watch device 10 will detect this absence and output an audible, visual, and/or tactile stimuli to the user. In some embodiments, alerting watch device 10 will output a control signal to visual display 26 to illuminate CHK icon 48 and the corresponding transmitter icon (i.e. sound monitor icon 34, telephone/TTY/VCO icon 36, door/window access icon 38, fire alarm icon 40, carbon monoxide (CO) icon 42, weather alert icon 44, and/or miscellaneous icon 46). For example, if supervisory signal 752 is absent from fire alarm transmitter 400, alerting watch device 10 will alert the user of the communications failure by illuminating fire alarm icon 40 and CHK icon 48 and simultaneously actuating the speaker 32 and/or vibrating motor 24. In some embodiments, alerting watch device 10 can provide an alert indicative of a communication failure to one of a plurality of like transmitters, such as one of five (5) fire alarm transmitters in the building. Moreover, in some embodiments, using discrete supervisory signals 752, alerting watch device 10 can provide an alert indicative of the type of failure, such as outside maximum range, low battery condition, and the like.

With particular reference to FIG. 1, in some embodiments, many of the features of alerting watch device 10 can be incorporated into a table-mounted device or non-wristwatch style alerting device 800. In some embodiments, alerting device 800 can comprise receiver 14, microprocessor 16, visual display 26, power source 30, and backlight 28. It should also be appreciated that additional features of alerting watch device 10 can be incorporated within alerting device 800 as desired, such as the ability to receive alarm signal 750 and supervisory signal 752 from each of the plurality of transmitters, detect cessation of supervisory signal 752 and output stimulus indicative of such cessation, and detect presence of alarm signal 750 and output stimulus indicative of an alarm.

Load Shedding

In some embodiments, where limited power is available or battery life is to be extended, it is desirable to limit the overall power consumption of control circuit 12. If control circuit was permitted to be continuously active, it may limit battery life of alerting watch device 10. Although the following is discussed in the interest of conserving power from power source 30, it should be appreciated that in some applications, such as table-mounted device 950, such power management and load shedding protocol may be optional.

In some instances, control circuit 12 could consume too much power if it were to be active 100% of the time. The majority of power of control circuit 12 is consumed by two devices—namely, receiver 14 and vibrating motor 24. In order to minimize power consumption, the plurality of transmitters and alerting watch device 10 are configured so that alerting watch device 10 can operate with a minimal amount of battery power but not miss an alarm (i.e. alarm signal 750 and supervisory signal 752). The feature created for this purpose is referred to as "load shedding". The microprocessor 16 has direct control over all of its circuits and shuts down the circuits so that the total amount of current drawn is minimized. To detect an incoming signal (i.e. alarm signal 750 and supervisory signal 752), microprocessor 16 turns on receiver 14 and listens for a transmitted signal start bit. If detected, receiver 14 will remain on until the entire signal is received and interpreted. If no signal is detected, receiver 14 is turned off. The start bit extends between the time-on periods so that it will not be missed. The start bits and data sent with it provide the information to alerting watch device 10 for an alarm or supervisory signal. The start bits and data bits are repeated for a period of time so that alerting watch device 10 will catch the data and align itself with the beginning of the data—the start bit.

Once alarm signal 750 is detected, alerting watch device 10 can, at least in part, pulse the vibrating motor 24 in a predetermined sequence so as to alert the user of the type of alarm received as discussed herein. The pulse codes can also be recalled by depressing one of the side buttons 22 located on the side of alerting watch device 10.

Battery Power

Power source 30 of alerting watch device 10 provides the power to operate all functionality of alerting watch device 10. In some embodiments, power source 30 is a re-chargeable Lithium-ION battery. The battery offers high capacity and an operating voltage within the range of the high sensitivity receiver 14 and microprocessor 16. The microprocessor 16 controls and/or allocates the power to significant circuit elements, such as receiver 14.

As discussed herein, receiver 14 is turned on for a period of 200 milli-seconds out of every second and will detect the alarm signal 750 and supervisory signal 752. The reduction in power consumption of receiver 14 provides for longer battery life.

Charger

As seen in FIGS. 1 and 6-8, alerting system 1000 further comprises a charger 900. The battery(ies) of alerting watch device 10 are designed to operate for a period of more than 24 hours. However, alerting watch device 10 and, more specifically, the battery(ies) of power source 30 will need to be recharged in order for it to maintain proper operation. All other functions, such as transmitter address and the like, are maintained in non-volatile memory and will not be lost in the event of complete power loss.

Charger 900 serves as the base station where alerting watch device 10 can be docked at night, for example, and recharge its internal battery. During this time that alerting watch device 10 is coupled to charger 900, it does not cease performing its alerting and supervisory functions. In fact, in some regards, additional features are provided when alerting watch device 10 is coupled to charger 900, such as the ability to output a tactile stimulus to an off-board vibrator, such as a mattress vibrator 924 operable to vibrate the mattress of the user to alert the user of a predetermined condition.

Figure 6:
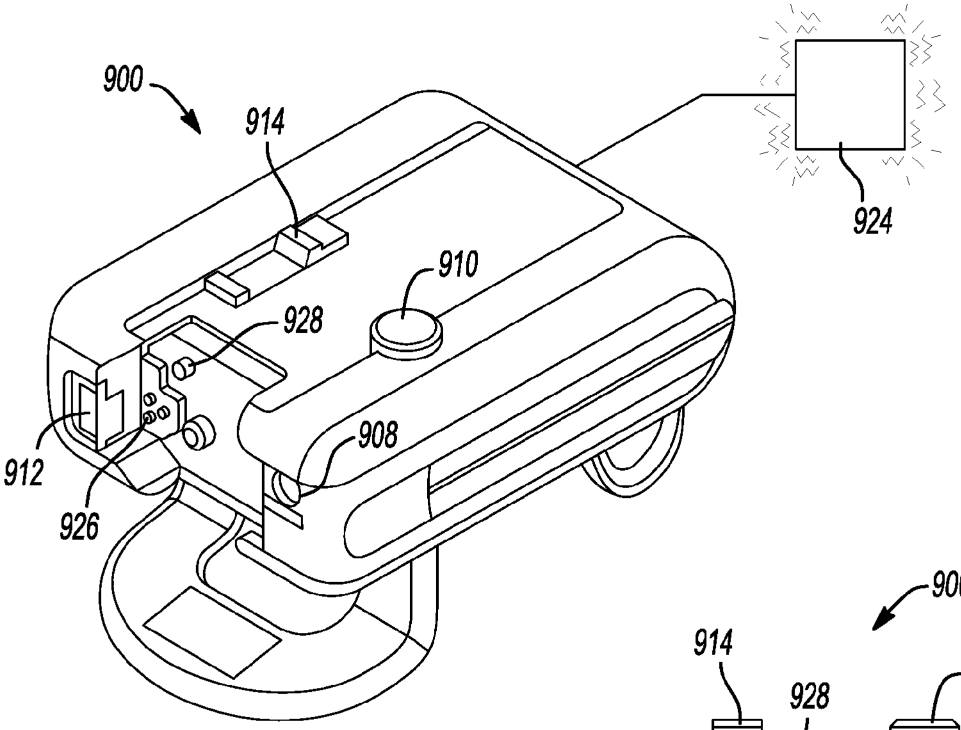
FIG. 6 is a perspective view of a charger device according to the principles of the present teachings.
Figure 7:
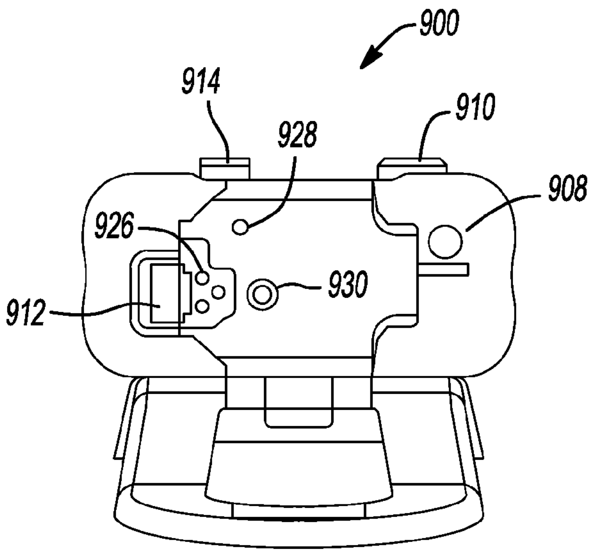
FIG. 7 is a front view of the charger device.
Figure 8:
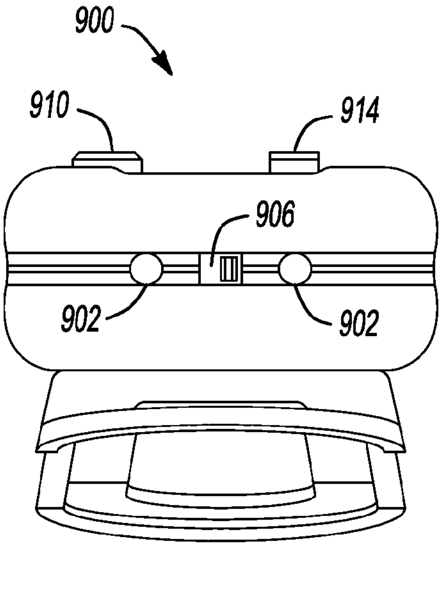
FIG. 8 is a rear view of the charger device.

In some embodiments, as seen in FIGS. 6-8, charger 900 can supplement many of the functions of alerting watch device 10. Specifically, as described above, charger 900 can comprise an off-board vibration output 902 operably coupled to mattress vibrator 924 to transmit a tactile stimulus (i.e. pulsed sequence vibration, as described herein) to the user when alerting watch device 10 is not being worn. It should be understood that off-board vibration output 902 can also be an off-board strobe output for providing visual, rather than tactile, stimulus.

Moreover, charger 900 can comprises a power input 904, a battery backup selector 906, an indicator light 908, a recall button 910, a watch release button 912, and a power on/off switch 914. Power input 904 is operable to receive power from a standard power outlet for powering charger 900 and charging alerting watch device 10. Battery backup selector 906 can be used for actuating the battery backup system of charger 900 for powering alerting watch device 10 in the event of a power failure and battery discharge. Indicator light 908 can be a two-color LED operable to provide a first color indicating a charging state and a second color indicating a charged state. It should be understood that other multi-color or multi-lamp illuminators may be used for additional messaging capability. Watch release button 912 can be used to selectively retain/release alerting watch device 10 with charger 900.

Alerting watch device 10 is operably coupled to charger 900 via a plurality of electrical plungers 926 electrically engaging contacts (not shown) on the rear of alerting watch device 10. The plurality of electrical plungers 926 can be selectively activated to provide electrical charging and communication via an On/Off plunger 928. When alerting watch device 10 is engaged with charger 900, backside of alerting watch device 10 contacts and overcomes the normally outwardly-biased On/Off plunger 928 thereby energizing the plurality of plungers 926 and establishing electrical communication with alerting watch device 10. It should be appreciated that greater or fewer plungers may be used than is illustrated.

An spring-biased extraction member 930 can be disposed generally adjacent the plurality of plungers 926 to urge alerting watch device 10 out of engagement with charger 900 when watch release button 912 is actuated.

Charger 900 can further provide a reset function or programming function for programming the features of alerting watch device 10. To this end, a factory default setting can be stored in the circuitry of charger 900 and activated when alerting watch device 10 is coupled thereto.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An alerting system for alerting a user, said alerting system comprising:

a transmitter monitoring a predetermined condition and outputting an alarm signal in response to detection of said predetermined condition, said transmitter further outputting a supervisory signal indicative of operation of said transmitter; and an alerting device receiving said alarm signal and said supervisory signal from said transmitter, said alerting device detecting cessation of said supervisory signal being received by said alerting device and outputting a first alert signal to the user indicative of said cessation of said supervisory signal, said alerting device further detecting presence of said alarm signal and outputting a second alert signal to the user indicative of presence of said predetermined condition, said alerting device having:

a receiver receiving said alarm signal and said supervisory signal and outputting data;

a microprocessor receiving said data and generating said first alert and said second alert;

a visual display operably coupled to said microprocessor, said visual display displaying at least a visual cue in response to at least one of said first alert and said second alert;

a first tactile stimuli generator operably coupled to said microprocessor, said first tactile stimuli generator generating a first tactile stimulus felt by the user in response to at least one of said first alert signal and said second alert signal; and a power source operably coupled to said microprocessor;

a crystal device maintaining time, said crystal device operably coupled to said microprocessor for outputting current day time to said visual display;

a watch housing containing said receiver, said microprocessor, said visual display, said first tactile stimuli generator, and said crystal device;

a watch strap operably coupled to said watch housing for coupling said watch housing in intimate contact with the wrist or arm of the user;

a charger unit selectively connectable with said watch housing, said charger unit charging said power source when said watch housing is connected with said charger; and a second tactile stimuli generator operably coupled to said charger unit, said second tactile stimuli generator generating a second tactile stimulus felt by the user in response to at least one of said first alert signal and said second alert signal output from said microprocessor.

2. The alerting system according to claim 1, wherein said alerting device further comprises:

an antenna operably coupled to said receiver, said antenna extending from said receiver and being fully encapsulated within said watch strap.

3. The alerting system according to claim 2, wherein said watch strap is integrally formed with said watch housing and substantially opposes relative movement between said watch housing and said watch strap in a zone on said watch strap generally adjacent said watch housing.

4. The alerting system according to claim 1, wherein said alerting device further comprises:

a speaker device operably coupled to said microprocessor, said speaker device outputting an audible stimulus heard by the user in response to at least one of said first alert and said second alert.

5. The alerting system according to claim 1 wherein said first alert and said second alert are distinct.

6. An alerting system for alerting a user, said alerting system comprising:

a plurality of transmitters each monitoring a predetermined condition and outputting an alarm signal in response to detection of said predetermined condition, at least one of said plurality of transmitters further outputting a supervisory signal indicative of operation of said at least one transmitter; and an alerting watch device receiving said alarm signals and said supervisory signal from said plurality of transmitters, said alerting watch device detecting cessation of said supervisory signal and outputting a first alert signal to the user indicative of said cessation of said supervisory signal, said alerting watch device further detecting presence of said alarm signals and outputting a second alert signal to the user indicative of presence of said predetermined condition, said alerting watch device having:

a receiver receiving said alarm signals and said supervisory signal and outputting data;

a microprocessor receiving said data and generating said first alert and said second alert;

a visual display operably coupled to said microprocessor, said visual display displaying at least a visual cue in response to at least one of said first alert and said second alert that is uniquely indicative of one of said plurality of transmitters;

a crystal device maintaining time, said crystal device operably coupled to said microprocessor for outputting current day time to said visual display;

a first tactile stimuli generator operably coupled to said microprocessor, said first tactile stimuli generator generating a first tactile stimulus felt by the user in response to at least one of said first alert signal and said second alert signal that is uniquely indicative of one of said plurality of transmitters;

a power source operably coupled to said microprocessor;

a watch housing containing said receiver, said microprocessor, said visual display, said first tactile stimuli generator, and said crystal device;

a watch strap operably coupled to said watch housing for coupling said watch housing in intimate contact with the wrist or arm of the user;

a charger unit selectively connectable with said watch housing, said charger unit charging said power source when said watch housing is connected with said charger; and a second tactile stimuli generator operably coupled to said charger unit, said second tactile stimuli generator generating a second tactile stimulus felt by the user in response to at least one of said first alert signal and said second alert signal output from said microprocessor.

7. The alerting system according to claim 6, wherein said alerting watch device further comprises:

an antenna operably coupled to said receiver, said antenna extending from said receiver and being fully encapsulated within said watch strap.

8. The alerting system according to claim 7, wherein said watch strap is integrally formed with said watch housing and substantially opposes relative movement between said watch housing and said watch strap in a zone on said watch strap generally adjacent said watch housing.

9. The alerting system according to claim 6, wherein said alerting watch device further comprises:

a speaker device operably coupled to said microprocessor, said speaker device outputting an audible stimulus heard by the user in response to at least one of said first alert and said second alert.

10. The alerting system according to claim 6, wherein each of said alarm signals from said plurality of transmitters is distinct and identifiable.

11. An alerting system for alerting a user, said alerting system comprising:

a first transmitter monitoring a first predetermined condition and outputting an first alarm signal in response to detection of said first predetermined condition, said first transmitter further outputting a first supervisory signal indicative of operation of said first transmitter;

an alerting device receiving said first alarm signal and said first supervisory signal from said first transmitter, said alerting device detecting cessation of said first supervisory signal being received by said alerting device and outputting a first alert signal to the user indicative of said cessation of said first supervisory signal, said alerting device further detecting presence of said first alarm signal and outputting a second alert signal to the user indicative of presence of said first predetermined condition, said alerting device having a power source; and a charger unit selectively connectable with said alerting device, said charger unit charging said power source when said alerting device is connected with said charger, said charger unit operably coupled to a first tactile stimuli generator, said first tactile stimuli generator generating a first tactile stimulus felt by the user in response to at least one of said first alert signal and said second alert signal.

12. The alerting system according to claim 11 wherein said alerting device comprises:

a second tactile stimuli generator generating a second tactile stimulus felt by the user in response to at least one of said first alert signal and said second alert signal.

13. The alerting system according to claim 11 wherein said first tactile stimuli generator is spaced apart from said charger unit.

14. The alerting system according to claim 11 wherein said alerting device comprises:

a visual display displaying at least a visual cue in response to at least one of said first alert signal and said second alert signal.

15. The alerting system according to claim 11 wherein said alerting device comprises:

an audible system outputting at least an audible cue in response to at least one of said first alert signal and said second alert signal.

16. The alerting system according to claim 11 wherein said alerting device comprises a watch.

17. The alerting system according to claim 11 wherein said alerting device comprises a watch having a watch housing and a watch strap, said watch strap having an encapsulated antenna contained therein.

18. The alerting system according to claim 11 wherein said watch strap is integrally formed with said watch housing and substantially opposes relative movement between said watch housing and said watch strap in a zone on said watch strap generally adjacent said watch housing.

19. The alerting system according to claim 11 wherein said alerting device is a non-wrist watch style alerting device.

20. The alerting system according to claim 11 wherein said alerting device is a table-mounted alerting device generally configured to reside on a tabletop.

21. The alerting system according to claim 11 wherein said first alert signal and said second alert signal are distinct and identifiable by the user.

22. The alerting system according to claim 11, further comprising:

a second transmitter monitoring a second predetermined condition and outputting an second alarm signal in response to detection of said second predetermined condition, said second transmitter further outputting a second supervisory signal indicative of operation of said second transmitter, wherein said alerting device receives said second alarm signal and said second supervisory signal from said second transmitter, said alerting device detecting cessation of said second supervisory signal being received by said alerting device, said alerting device alerting the user of said cessation of said second supervisory signal, said alerting device alerting the user of the presence of said second predetermined condition.

23. The alerting system according to claim 20 wherein said alerting device outputs a uniquely identifiable cue to the user of the presence of said first predetermined condition relative to said second predetermined condition.

* * * * *